United States Patent
Gullichsen

(10) Patent No.: US 8,386,102 B2
(45) Date of Patent: Feb. 26, 2013

(54) DISCRETE VOLTAGE LEVEL CONTROLLER

(75) Inventor: Eric Gullichsen, Piha (NZ)

(73) Assignee: Eric Gullichsen, Piha (NZ)

( * ) Notice: Subject to any disclaimer, the term of this patent is extended or adjusted under 35 U.S.C. 154(b) by 615 days.

(21) Appl. No.: 12/620,501

(22) Filed: Nov. 17, 2009

(65) Prior Publication Data

US 2011/0118916 A1 May 19, 2011

(51) Int. Cl.
*B60L 9/00* (2006.01)

(52) U.S. Cl. ............. 701/22; 701/54; 701/85; 701/103; 180/65.1; 180/65.23; 180/174; 318/139; 318/251; 318/246; 318/250; 318/249; 340/636.15; 340/636.1; 340/584

(58) Field of Classification Search .............. 701/22, 701/103, 85, 54; 180/65.1, 174, 65.23; 318/139, 318/251, 246, 250, 249, 521, 259; 340/636.15, 340/636.1, 584
See application file for complete search history.

(56) References Cited

U.S. PATENT DOCUMENTS

| | | | |
|---|---|---|---|
| 1,291,233 A | 1/1919 | Storer | |
| 1,474,942 A | 11/1923 | Probst | |
| 3,984,744 A | 10/1976 | Moody | |
| 4,019,106 A | 4/1977 | Van Doren | |
| 4,054,932 A * | 10/1977 | Sehmer et al. | 361/31 |
| 4,088,110 A * | 5/1978 | Sperline | 123/198 DB |
| 4,255,789 A | 3/1981 | Hartford et al. | |
| 4,309,645 A * | 1/1982 | De Villeneuve | 388/829 |
| 4,415,844 A | 11/1983 | Mendenhall et al. | |
| 4,471,276 A | 9/1984 | Cudlitz | |
| 4,626,750 A | 12/1986 | Post | |
| 4,675,585 A | 6/1987 | Krueger et al. | |
| 5,316,101 A * | 5/1994 | Gannon | 180/221 |
| 6,028,404 A * | 2/2000 | Yang | 318/111 |
| 6,118,186 A | 9/2000 | Scott et al. | |
| 7,023,683 B1 * | 4/2006 | Guo et al. | 361/166 |
| 7,132,808 B1 | 11/2006 | Thexton et al. | |
| 2005/0127880 A1 * | 6/2005 | Colley | 322/7 |
| 2006/0110655 A1 * | 5/2006 | Wirdel | 429/61 |
| 2007/0113803 A1 * | 5/2007 | Froloff et al. | 123/90.11 |
| 2007/0262641 A1 * | 11/2007 | Stone | 307/10.1 |
| 2008/0116759 A1 * | 5/2008 | Lin | 310/184 |
| 2008/0129522 A1 * | 6/2008 | Densham et al. | 340/636.15 |
| 2009/0078481 A1 * | 3/2009 | Harris | 180/65.1 |

FOREIGN PATENT DOCUMENTS

WO    WO-2009094367 A1    7/2009

OTHER PUBLICATIONS

"Standard Handbook for Electrical Engineers", Sections 17-108 to 17-123, McGraw-Hill, Jun. 1922, pp. 1518-1521.

* cited by examiner

*Primary Examiner* — Redhwan K Mawari

(74) *Attorney, Agent, or Firm* — Michael A. Glenn; Glenn Patent Group

(57) ABSTRACT

In an electrically powered vehicle, a computer-controlled switching system activates relays to switch additional discrete batteries into a circuit in response to throttle level, where a processor is configured to decide what specific batteries should be present in the circuit at any given time, in response to both throttle level and a battery load balancing optimization scheme.

19 Claims, 9 Drawing Sheets

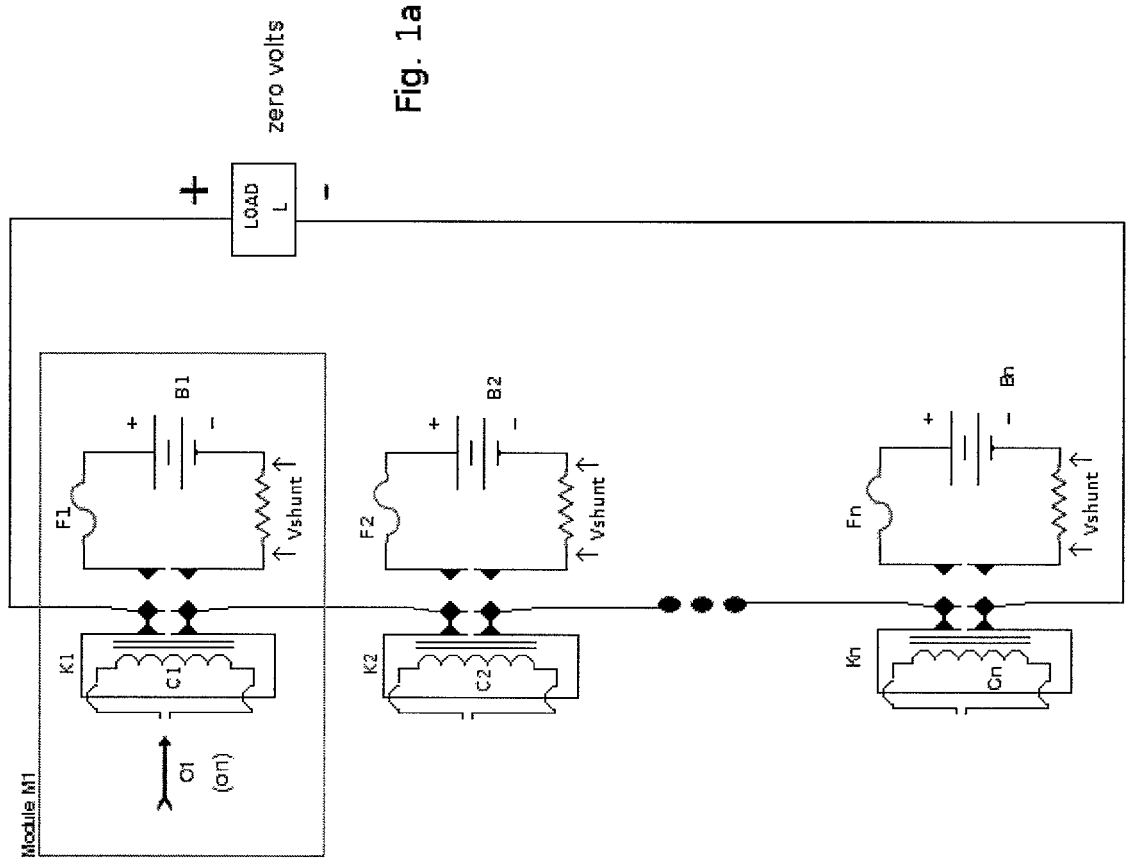

DISCRETE VOLTAGE LEVEL CONTROLLER

BACKGROUND OF THE INVENTION

1. Technical Field

The invention relates to the motor speed control of electric vehicles powered by multiple batteries, specifically the use of multiple relays (electromechanical or solid state) as a way of discretely switching additional batteries into the circuit when more motor speed is requested, to increase supplied voltage and thereby motor speed, under the control of a computer algorithm which ensures that the battery bank remains balanced.

2. Description of the Background Art

Contemporary electric vehicles use motor speed controllers built from a plurality of one or more power transistors, typically MOSFETs or IGBT(s). A plurality of batteries are connected together, typically in series, to achieve the higher voltages needed for the motor, and the most positive and most negative terminals of the battery bank are connected to the motor speed controller.

In the current state of the art for a DC motor controller, a sensor such as a potentiometer or optical encoder attached to the vehicle's accelerator pedal causes a circuit to modify the pulse width of a square wave which is amplified to control the switching of the MOSFETs or IGBT(s), thereby chopping at high frequency the entire current from the battery bank before it reaches the motor, and thereby controlling the mechanical speed of the motor. See, for example, Cudlitz, U.S. Pat. No. 4,471,276.

Power transistors that are capable of switching the high currents used in electric vehicle applications are expensive. At higher voltage or current ratings, arrays of power transistors must be used, thus increasing controller complexity and expense. Unless over-rated, power transistors can be fragile, and over voltage conditions such as a battery surface charge or ringing due to wiring inductance can exceed the power ratings of the transistors and cause cascading and, in some circuit topologies, catastrophic explosive failure of the controller. These power electronic components are also sensitive to heat, such that excessive load can cause failure due to self-generated heat.

Furthermore, the use of power transistors to switch the entire current flow from the main battery bank is not efficient. The transistors have inherent switching and/or conduction losses that cause power loss in the form of heat dissipation. This is inefficient, wasting energy that could be used for propulsion, and reducing both battery life and the maximum allowable time between charges, while also mandating a larger minimum size, weight, and cost for the battery bank.

Even an inefficiency of a few percent in the power transistors, as in the current state of the art, causes a significant production of waste heat when power levels of many hundred kilowatts are used, such as in high power electric vehicle applications. Because the devices are intolerant of high heat, excessive load can cause failure due to self-produced thermal energy. This is exacerbated in solid state components that have a forward voltage drop which grows with increasing temperature and, which are thus prone to thermal runaway. This necessitates cooling, typically by fans or water cooling, adding both complexity and expense to the controller system.

Historically, electric vehicles that were in service extensively in the early 20th century before the domination of the automobile marketplace by the internal combustion engine used different, and simpler, techniques for motor speed control.

In one approach, a very large resistive element or parallel plurality of resistive elements was used to dissipate energy from the battery pack before it reached the electric motor. The energy dissipation was in the form of heat, and this style of controller was highly inefficient because, whenever the motor was not operating at full throttle, a significant proportion of the energy being delivered by the battery pack was deliberately wasted. This approach had the undesirable side effect of greatly reducing vehicle range. In this approach, again the entire battery pack was connected to the motor through the resistive motor controller.

In another approach, individual batteries were switched into the circuit at different times, typically by a large multi-pole drum switch that incorporated resistive elements, (see, for example, Storer, U.S. Pat. No. 1,291,233) or, later, with arrays of contactor (see, for example, Moody, U.S. Pat. No. 3,984,744) or rectifier contactor (as used in a controller manufactured by Seecom) circuits. Again, this approach significantly compromises vehicle range because, during a typical drive requiring varying speeds, the batteries that were switched into the circuit earlier at lower throttle settings, are discharged sooner than those batteries switched in only rarely when full power is requested. Additionally, battery life is compromised by this approach because some batteries in the pack would consistently be used more than others. Unequally discharged batteries also complicate effective battery charging, especially if the unequally charged batteries are in a series string, as is typical.

In another historical approach, the battery bank was commutated, i.e. the battery bank was divided into two or more equal-sized groups which could be reconnected in series or in parallel under the control switch(es). This approach typically provided a very limited number of speed settings, and is thereby disadvantageous for practical reasons and considerations of safety.

While the problem of precise motor speed control has been addressed (see, for example, De Villeneuve, U.S. Pat. No. 4,309,645 and Mendenhall, U.S. Pat. No. 4,415,844), what is truly needed is a robust and low-cost controller for high power applications, such as electric vehicles, where a number of discrete throttle positions equal to the number of batteries in the system is an acceptable granularity.

SUMMARY OF THE INVENTION

The invention relates to the use of a computer to execute an algorithm that controls individual relays or solid-state switching devices, typically one per battery, switching them into the circuit as needed in response to a controller input level.

The computer also continuously senses the amount of current delivered by each individual battery to the load. Note that when the relay for a given a battery is open, the battery at that time delivers zero current to the load. As would be obvious to someone versed in the art, the sensing of battery load could be achieved by measuring the current produced by each battery with an ammeter shunt or Hall effect current sensor on a lead from each battery, an A/D converter attached to the computer reading the voltage drop across each shunt or the voltage output of each hall sensor which is proportional to the current flowing from the corresponding battery.

The computer also continuously integrates the A/D input channel for each battery. In this way, the computer has a real time record of the total energy emitted by each battery since the battery bank was last recharged.

At all times the computer also senses the value of the controller input level. For an electric vehicle application the controller input is the accelerator pedal. A potentiometer used as a voltage divider, with the resulting voltage fed into another A/D input channel for the computer, is one way to realize this input. Others will be obvious to those versed in the art.

One primary function of the computer is to close a number of battery relays proportional to the controller input level. When the controller input is fully off, all battery relays are in a position such that no batteries are present in the circuit. When the controller input is full on, all battery relays are closed and the entire battery pack is delivering its current in series to the load. At intermediate controller input settings, an appropriate discrete number of the batteries in the bank are switched into the circuit by closing the appropriate number of relays.

Another function of the computer is to decide at any time exactly which subset of relays should be open. There are many algorithms which can be employed to make this decision, at a regular time interval appropriate to the application, in such a manner as to assure almost uniform discharge of all batteries in the pack. The simplest of these is arguably to identify by means of a simple linear search performed at regular time intervals, e.g. one second, through the integrated current values retained for each battery:

1) Which battery has the highest integrated total energy output since pack recharge; and
2) Which battery has the lowest integrated total energy output since pack recharge; and then
3) To open the relay for battery identified in (1) above, and close the relay for battery identified in (2) above, thereby removing battery (1) from the circuit and simultaneously adding battery (2) to the circuit.

This is in ways analogous to a Least Recently Used (LRU) computer caching algorithm.

For different battery chemistries, and different requirements of stability of controller power output, different time intervals may be suitable. For example, in an electric vehicle application where the vehicle is moving at constant speed on a level road, only six out of the twelve batteries in the pack might be switched into into the load. At one-second intervals, the battery with the highest integrated total energy output since pack recharge would be switched out of the circuit, and replaced by switching in the battery with the lowest integrated total energy output since pack recharge. If solid state relays are used, a much faster battery switching frequency, such as 100 Hz, is appropriate.

An embodiment of the invention comprises a discrete (or digital) motor speed controller that offers a number of throttle positions equal to the number of batteries in the system. For electric vehicle applications where there are 12 to 24 batteries, this is appropriate.

The relay could be an electromechanical relay, such as a magnetic solenoid closing a contractor, or a more modern solid state relay, as appropriate for the power requirements and cost constraints of the application. Use of latching relays means the relays would only momentarily consume power when their state was switched and no power whatsoever, except the minimal current needed to power the computer, would be used by the controller in a steady-state condition.

It will be seen that this invention is superior to the state of the art in a number of ways.

The system can be of lower cost, not requiring the high-power transistors required by modern pulse width modulation controllers.

The invention is of greater reliability, relays being more robust than semiconductor power transistors. In some embodiments, this invention offers fault tolerance through redundancy, because it can operated with multiple damaged relays and/or batteries.

The invention is more efficient, almost 100%, with no heat being dissipated due to switching or resistive losses as with prior art approaches. This also means that cooling is not required, again simplifying and reducing the cost of the controller.

Finally, the use of a battery load-balancing algorithm to decide which batteries should be in the circuit at any moment, and switching batteries in or out of the circuit using a relay for each battery, activated by an amplified digital output from the computer, means uniform averaged energy output through time from each battery can be assured, thereby optimizing net battery energy usage for each battery and also ensuring optimal conditions for long battery pack life.

An additional advantage of the invention is that both the auxiliary 12-volt battery typically used to power a vehicle's accessories, and a DC/DC converter used to keep the auxiliary 12-volt battery charged from the main battery pack, are no longer needed. With prior art controllers, the auxiliary battery and DC/DC converter are needed because tapping 12 volts from one of the batteries, or from a series string of batteries, in the main pack would cause an unequal rate of discharge of the batteries, the battery being used for the 12-volt auxiliary power supplying more current than the other batteries in the pack. When the battery load balancing algorithm of this invention is employed, an arbitrary battery or series string of batteries from the pack can be tapped for auxiliary power, and the load-balancing algorithm automatically switches these battery(s) into the main circuit less frequently to the appropriate extent required to ensure the pack remains balanced.

It will also be appreciated by one versed in the art that either mechanical relays or solid state relays can be employed with this invention as appropriate for the needs, e.g. current capacity, budget, etc, of the application.

BRIEF DESCRIPTION OF THE DRAWINGS

FIGS. 1a and 1b provide a schematic diagram showing the interconnection of batteries and contactors for a first preferred embodiment of the invention;

FIG. 2a shows a rectifier contactor array with all batteries in parallel and FIG. 2b shows a rectifier contact array with batteries B1 and B2 in series;

DETAILED DESCRIPTION OF THE INVENTION

In the following description, the term "relay" encompasses all forms of mechanical relay and contactor, in addition to solid-state switching devices, such as metal oxide semiconductor field effect transistors (MOSFETs) and integrated gate bipolar transistors (IGBTs).

Disclosed herein are three alternative preferred topologies for the interconnection of batteries and contactors for this invention. Which is superior for a given application depends upon the relative price of contactors and rectifier diodes, diodes, and other factors related to the desired trade off between simplicity, expense, considerations of ambient operating environment, and requirements for silent operation. For all three cases, essentially the same battery control and load balancing algorithm is used to decide which relays are closed at any given time.

Figure 1B:
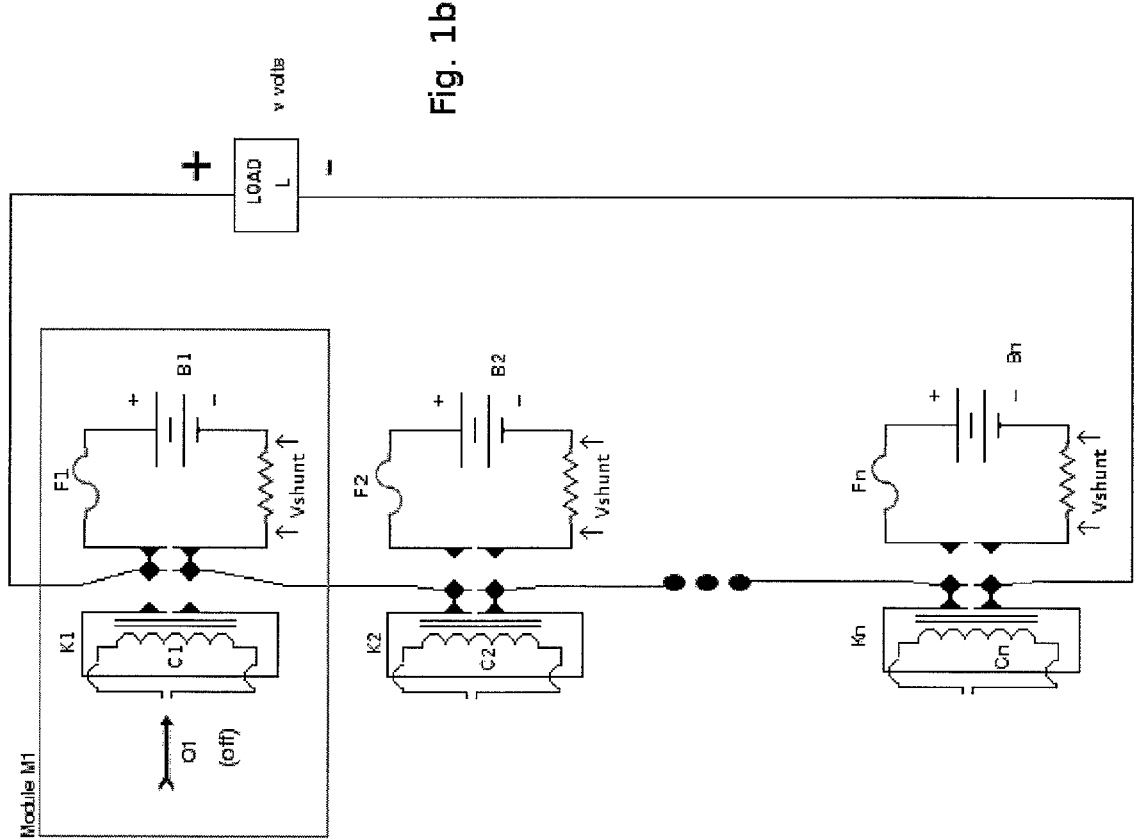

The first topology is shown in FIGS. 1a and 1b. This consists of a plurality of battery/relay modules Mi which can be connected in series, as shown in FIGS. 1a and 1b, (or alternatively in parallel) before being connected to a load L. Under the control of the corresponding solenoid Ci, each DPDT relay Ki can be in either the position shown in FIG. 1a, where the two poles of the relay K1 are shorted by the crowbar C1, or the position shown in FIG. 1b, where the two poles of the relay K1 are respectively attached to the cathode and anode of a battery B1. If each battery Bi is nominally v volts, then in FIG. 1a, zero volts are delivered to the load. In FIG. 1b, with solenoid C1 open, v volts are delivered to the load. It will be readily appreciated by one versed in the art that any of n+1 discrete voltage levels of: 0, v, 2 v, . . . nv volts can be delivered to the load, if n such modules Mi are connected in series. Each battery is protected by a corresponding fuse Fi.

An alternative realization is possible where the module is crowbarred when the solenoid is not powered. This may be preferred for safety reasons, if there is a fault in the solenoid the module fails in the off position, i.e. crowbarred.

Figure 4:
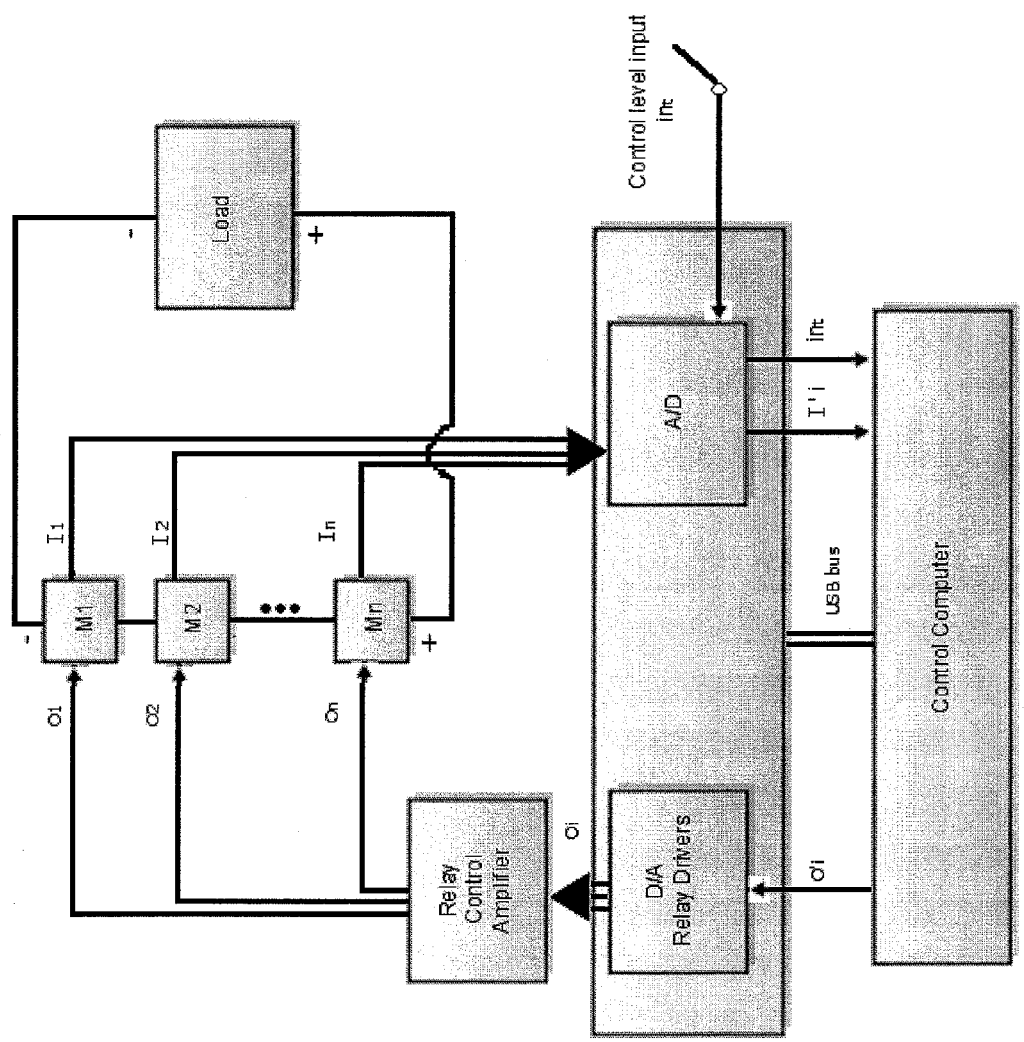
FIG. 4 is a block schematic diagram showing a discrete voltage level controller according to the invention.

As required for the battery load balancing component of the invention, the total current flowing through each battery Bi is measured by a Hall effect sensor or shunt for each battery (see FIG. 4). Note that each current sensor measures the total current supplied by all batteries, and the current delivered by each battery in the circuit at any time is the total current at that time, divided by the number of batteries in the circuit.

Figure 2A:
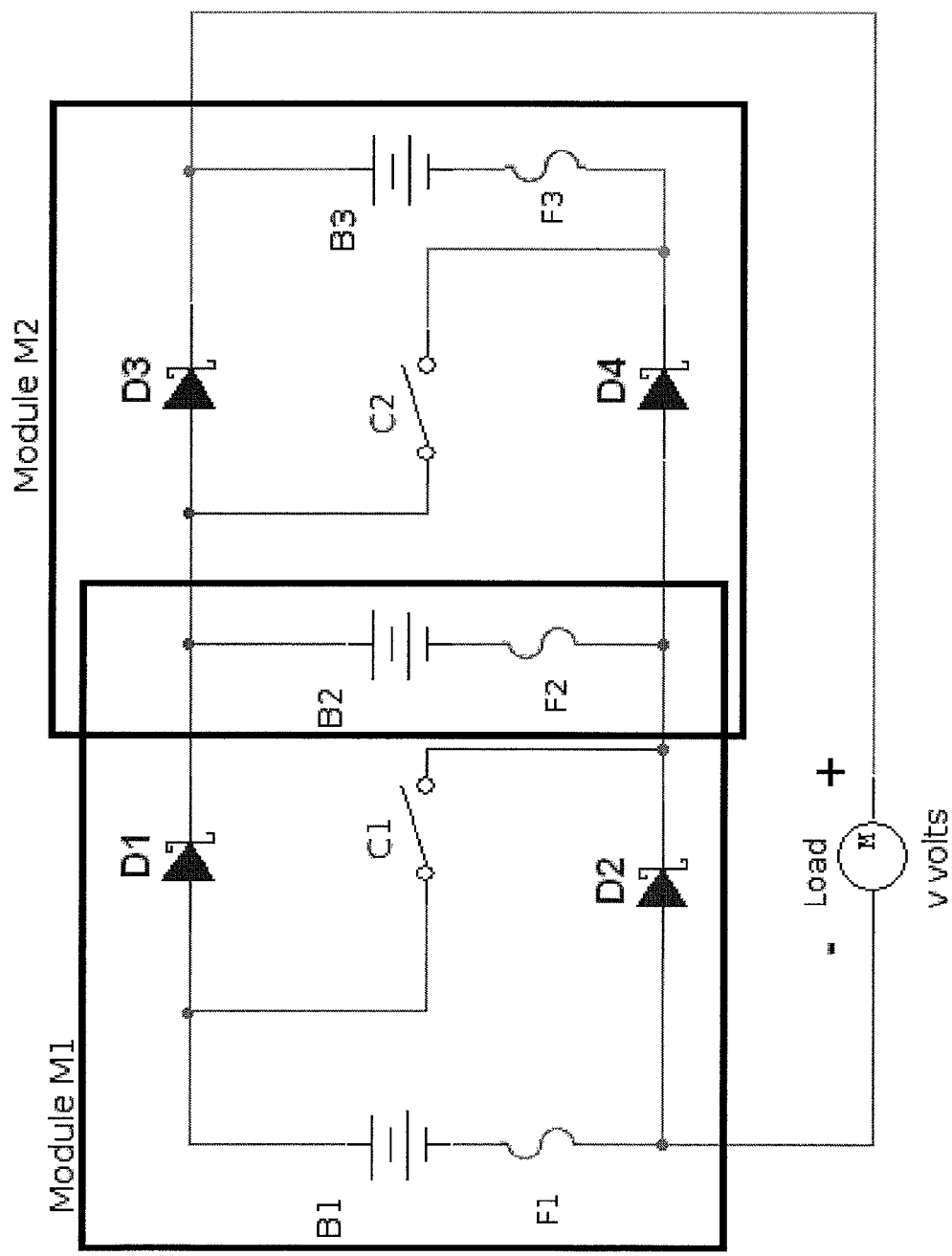
FIGS. 2a and 2b provide a schematic diagram showing the interconnection of batteries and contactors for a second, equally preferred embodiment of the invention, where
Figure 2B:
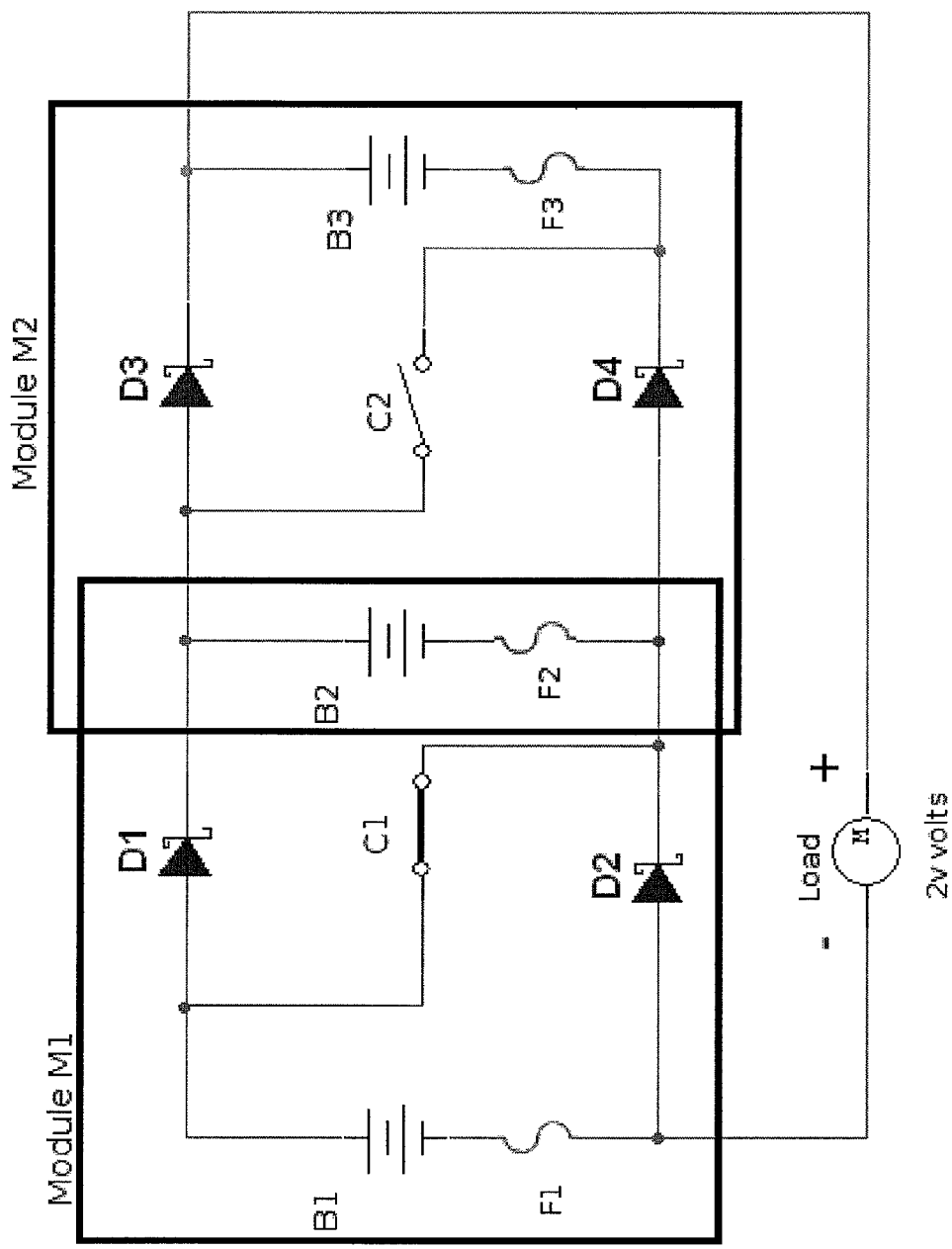

A second alternative topology for the invention is seen in FIGS. 2a and 2b. Here, each module Mi is an embodiment of a rectifier contactor circuit. A single module is used to switch two batteries, B1 and B2, each of v volts, from parallel to series connection, and thus can emit either v or 2 v volts. In FIG. 2a, C1 is open, the batteries B1 and B2 in M1 are in parallel, and the module M1 emits v volts. In FIG. 2b, C1 is closed, the batteries B1 and B2 are in series, and the module M1 emits 2 v volts. It will be readily appreciated by one versed in the art that although two modules are show in FIG. 2, any number of modules can be connected in series or in parallel, the number depending on the desired maximum voltage output, and the voltage of each battery.

An advantage of the second topology shown in FIGS. 2a and 2b over that of FIGS. 1a and 1b is that the required contactor relay is simplified from a DPDT to SPST, thereby reducing expense and complexity. A disadvantage of this approach is that rectifier diodes are required which, in some situations, may be more expensive than the more complex DPDT relay of the first topology. Note that diodes D1 and D2 could be replaced by SPST relays which operate synchronously with C1. Fuses F1 and F2 are required for safety in case a diode shorts. An additional advantage of this topology is that, unlike that of FIGS. 1a and 1b, voltage is never temporarily interrupted from the load when a relay changes states, as it is in the topology of FIGS. 1a and 1b. When the modules Mi are connected in the manner depicted in FIGS. 2a and 2b, any of n discrete voltage levels of: v, 2 v, nv volts can be delivered to the load.

Figure 3:
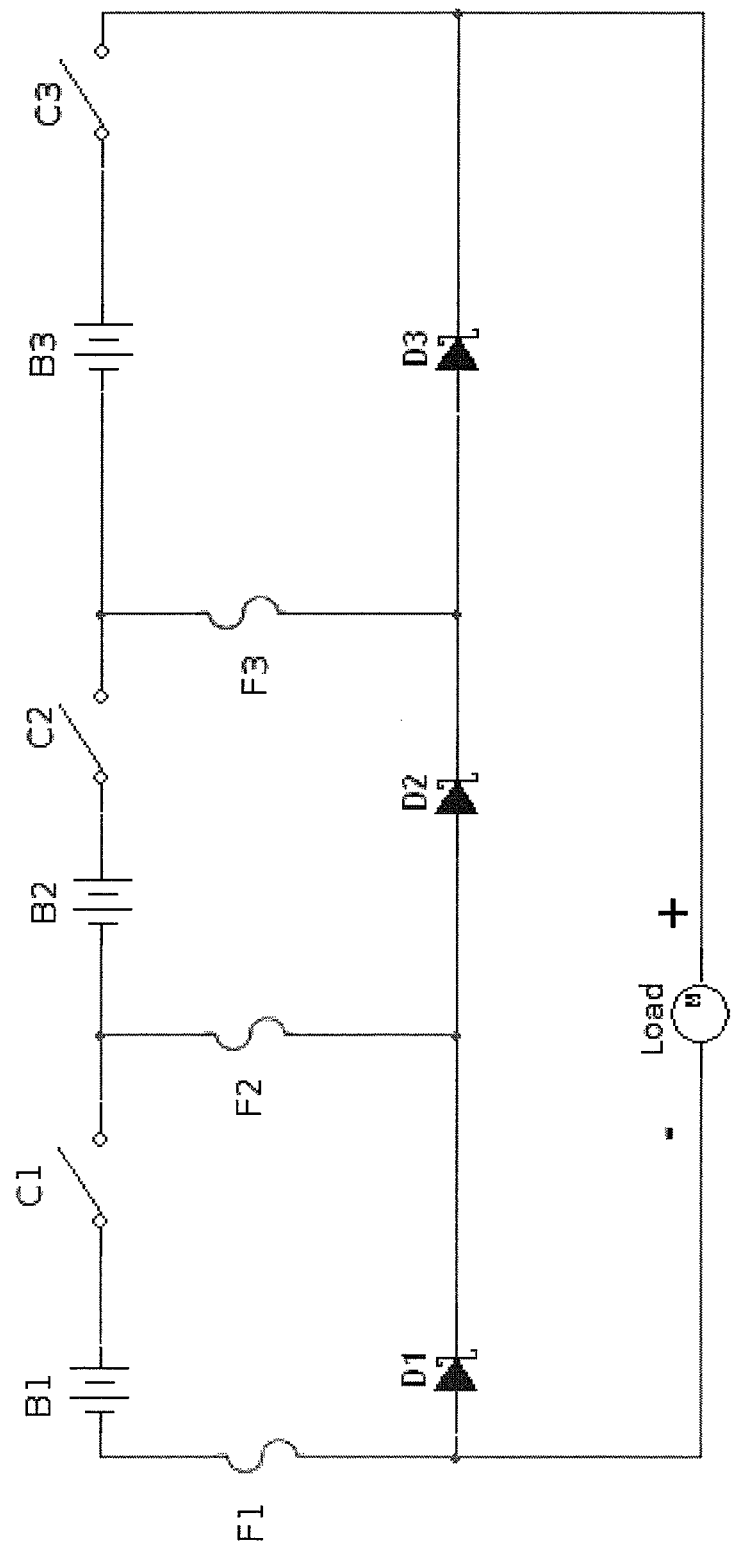
FIG. 3 provides a schematic diagram showing the interconnection of batteries and contactors for a third, equally preferred embodiment of the invention.

A third alternative series string topology for the invention is seen in FIG. 3. As for the other topologies, when each relay Ci is closed, an additional battery is switched into the series string. This topology also uses SPST relays, and has an advantage over that of FIGS. 2a and 2b in that zero volts are supplied when all switches Ci are open. A disadvantage is that the rectifier diodes must be rated to withstand the entire voltage of all batteries in series, and that more voltage drops are present in the circuit as more relays are open. Note that each diode could be replaced by multiple diodes in parallel, to reduce the voltage drop. Additionally, Schottky diodes having a low voltage drop can be used. It will be readily appreciated by one versed in the art that, although three modules are shown in shown in FIG. 3, any number of modules can be connected in series or in parallel, the number depending on the desired maximum voltage output, and the voltage of each battery.

For an electric vehicle application, for any of the above topologies, the batteries may be Lifeline GPL-31T AGM 12 v batteries, the contactors Yueqing Nanfeng ZJW400A, and the rectifiers may be Motorola MR1265FL silicon power rectifiers, although other components may be substituted therefore, as would be apparent to the person skilled in the art.

A disadvantage of all basic prior art battery switching schemes, as described in the above figures, is that they all cause the batteries to discharge unevenly. This is clearly the case in FIGS. 1a/1b and FIG. 3, where the batteries are switched entirely in or out of the circuit. For FIGS. 2a/2b, even though all batteries remain at all times in the circuit, the current provided by each battery for a given load varies depending on the state of the relays. For a given load with the relay open and the batteries in parallel, as in FIG. 2b, the current provided by each of the two batteries in a module (and carried by the diode) is only half of the total current load of those batteries in modules for which the corresponding relay is closed. Additionally, different batteries may discharge unequally due to differing internal resistances.

In view of the foregoing, the invention provides an embodiment that achieves balanced discharge of batteries by monitoring the current provided by each battery at all times, integrating each current individually, and using a battery load balancing algorithm, described in detail below. Regardless of which alternative topology for the configuration of batteries and relays is used for an embodiment of the invention, the same computer, battery current sensing, and control algorithm is used. A block diagram of this is shown in FIG. 4.

The current sense outputs Ii from the shunt or Hall effect sensor for each battery/relay module Mi are input to a multi-channel analog/digital converter, and are connected by USB or other bus to the control computer.

For each module Mi, the control computer produces a digital output signal O'i, having a state 0 or 1 that indicates whether the control algorithm described below is commanding the contact relay Ci in module Mi into the open or closed state, respectively. Each of these digital output signals O'i are amplified to the appropriate current level to drive the relays Ci by, for example, a transistor in the relay control amplifier.

In the preferred embodiment, both the D/A relay drivers and the A/D converters are physically in a multichannel USB I/O Data Acquisition device, such as the μChameleon (http://www.starting-point-systems.com/) or Labjack (http://labjack.com/).

Figure 5:
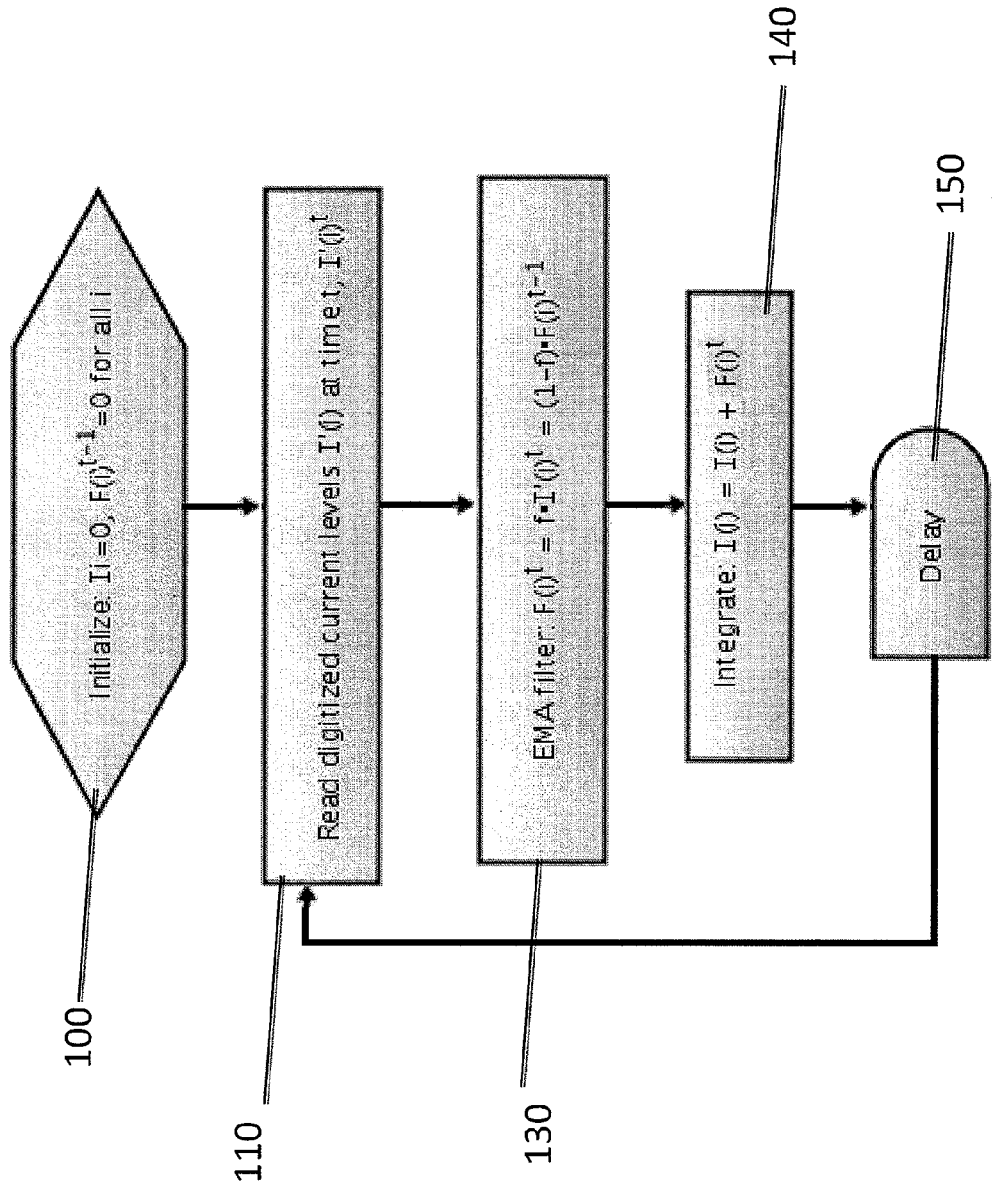
FIG. 5 is a flow diagram showing a current integration loop according to the invention.

FIG. 5 is a flow diagram showing a current integration loop, where the superscript t denotes time. The system is first initialized (100). In a sufficiently fast real time loop, e.g. 100 Hz to 1000 Hz, the control computer reads the digitized current levels I'i (110), low pass filters them with a suitable software filter (130), such as an exponential moving average kernel with an exponential scaling factor f, and sums them individually into registers to perform a discrete integration for each current level Ii (140). After a delay (150), the algorithm returns to read the current levels again. At the same time, the control computer is multitasking to run two other loops whose control structure is depicted in FIGS. 6 and 7.

Figure 6:
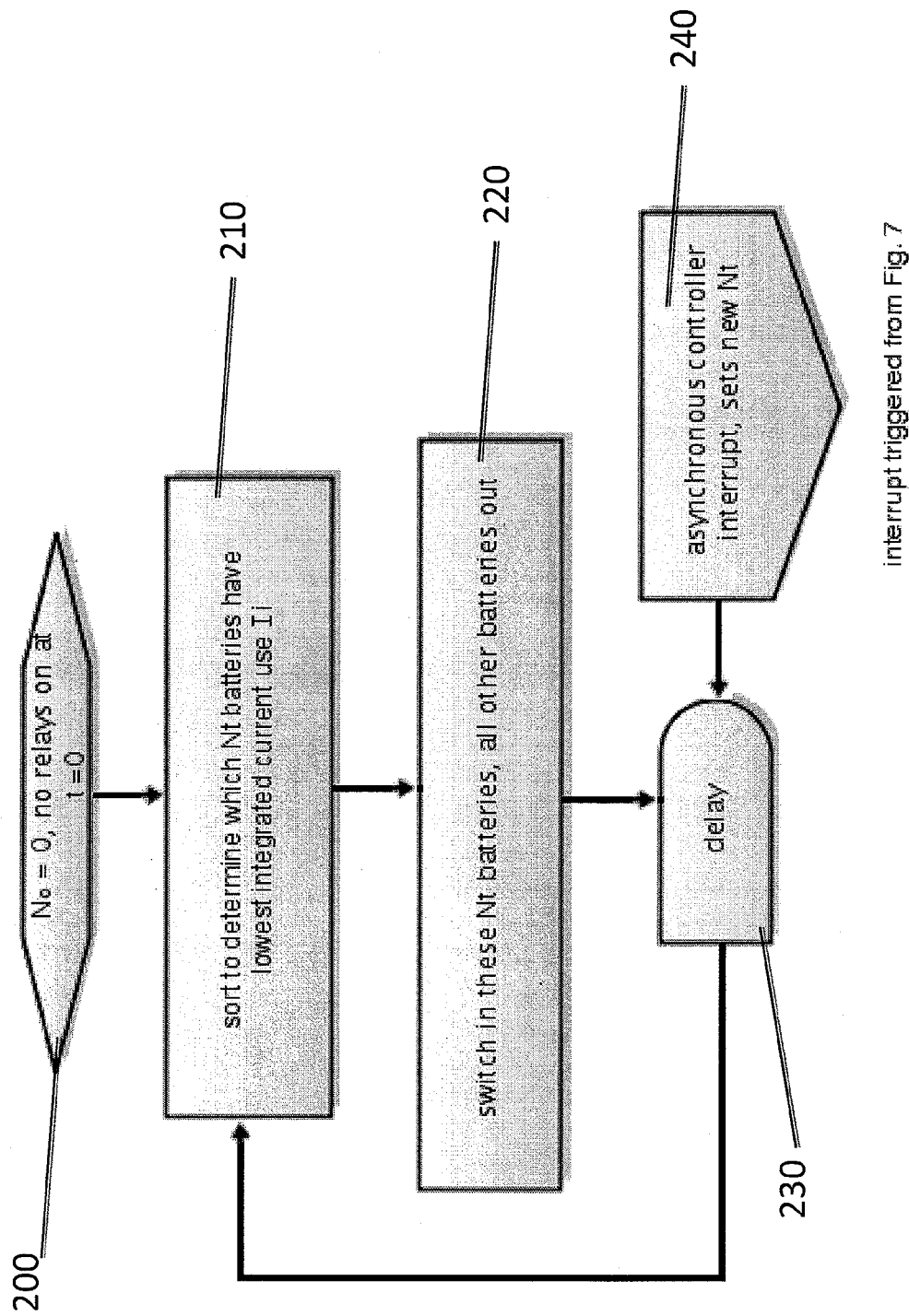
FIG. 6 is a flow diagram showing a relay control algorithm loop according to the invention.

FIG. 6 is a flow diagram showing a relay control algorithm loop, suitable for topologies 1 and 3 (discussed above in connection with FIGS. 1a/1b and 3) where individual batteries (or for topology 2, pairs of batteries) are switched in or out of the circuit. Initially, at t=0 the number of batteries Nt switched into the circuit is zero (200). The values of the contents of the integrated current registers Ii are sorted, to determine which batteries have the lowest total integrated current output (210). O'i values are set to 1 for those values of i corresponding to the Nt batteries with the lowest total integrated current usage. For all other i, O'i is set to zero. This switches into the circuit those batteries which have so far expended the least total current (220). This loop should run at about 0.1 to 1 Hz for mechanical relays, though it could feasibly run much faster if solid state relays are used. The delay portion (230) can be interrupted by an asynchronous interrupt (240) that is generated by the controller input polling loop, shown in FIG. 7.

Deciding which relays to close for the purposes of battery management is slightly more complex for the topology of FIGS. 2a/2b. When a relay is closed, the two batteries adjacent to this relay are in series, hence each of these two batteries is outputting twice the current it would be if the relay were open and the two batteries were in parallel. For this topology, batteries are switched into (or out of) series mode in adjacent groups. For a series/parallel topology with an arbitrary number of batteries instead of the three batteries shown in FIG. 3, when the throttle position demands that n batteries should be present in the circuit the system sorts all adjacent groups of size n by the sum of the of integrated current outputs of the batteries in the group. The least depleted group is switched into series mode by closing all relays in this group, and at the same time all the other more depleted batteries are switched into parallel mode by opening their relays.

Figure 7:
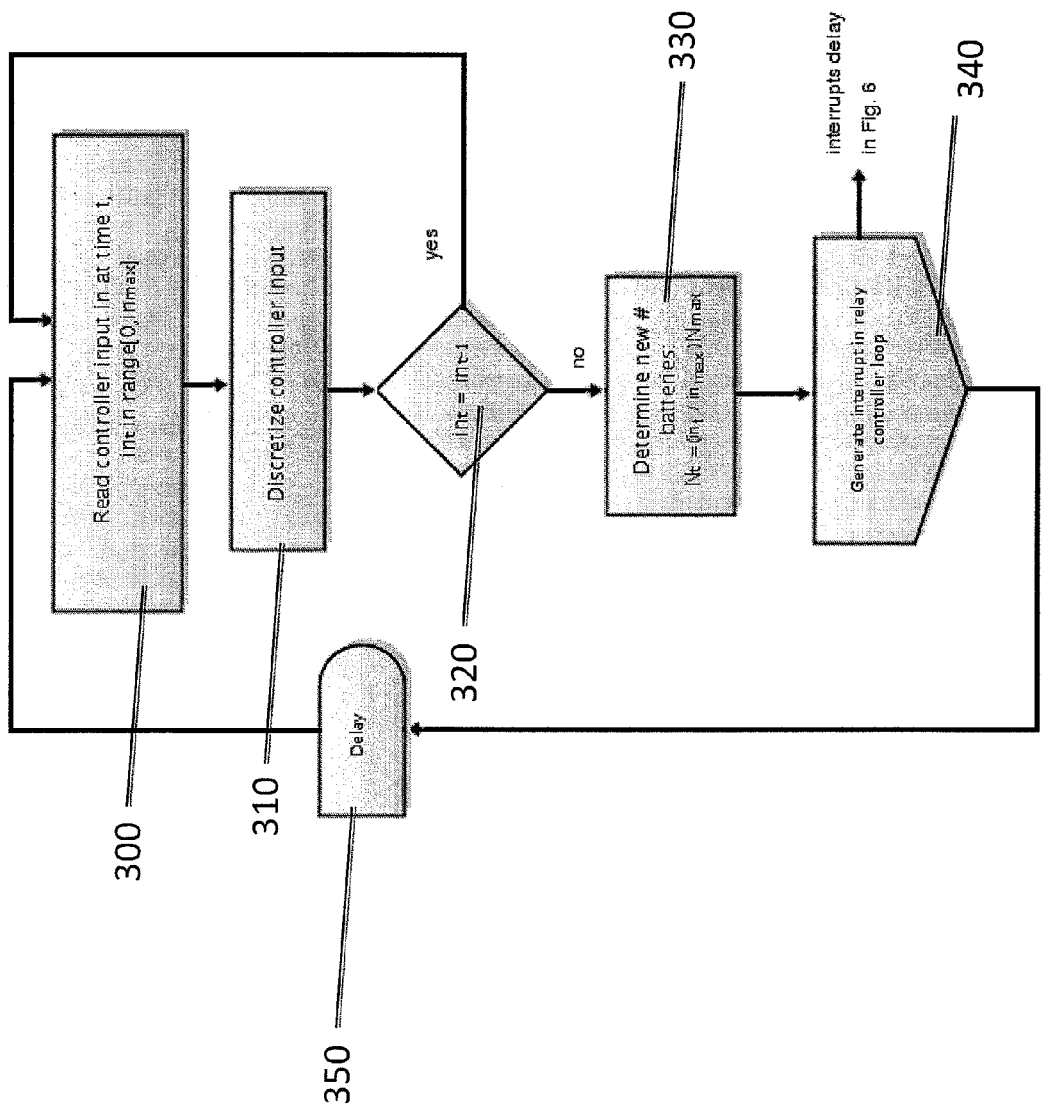
FIG. 7 is a flow diagram showing a controller input polling loop according to the invention.

FIG. 7 is a flow diagram showing a controller input polling loop. The external controller input $in_t$ is read at each time t (300), and digitized (310) by the A/D converter. If the input is unchanged (320), i.e. if $in_t = in_{t-1}$, the system delays (350) and loops to re-read the controller input at the next time t+1 (300). If the external controller input setting has changed $in_t \neq in_{t-1}$ (320), the discretized value (310) is used to determine how many batteries should be switched into the circuit (330), and the delay of FIG. 6 is interrupted (340) asynchronously to switch in the requested number of batteries immediately or, for topology 2 (FIGS. 2a/2b) to determine how many battery pairs should be switched into series to increase the voltage.

Instead of integrating current output from each battery to determine which battery has output the least energy, and hence should be switched into the circuit next, an alternative approach is to measure the voltage of each battery, and switch in the battery with the lowest voltage because this is the battery which is most discharged. An optoisolator such as the Analog Devices ACPL-782T can be used to measure the voltage of each battery, while ensuring isolation of the A/D circuitry from the high voltage battery circuit. Although less expensive than current sensing and integration, this voltage approach is less desirable because all batteries presently in the circuit would have a lowered voltage due to voltage sag caused by the load. This could cause a less discharged battery to be replaced by a more discharged battery, merely because the voltage of the former was lower due to it being switched into the circuit.

Although the inventors have for simplicity described the invention as using one relay per battery, a trade off can be achieved between controller expense and available number of discrete throttle levels. Further, where individual batteries are smaller, and/or a larger number of batteries are used in a system, it may be desirable to have a series or parallel string of batteries switched by a single relay, as opposed to using one relay per battery.

In the simplest realization of the invention, controller input is sensed to determine how many batteries are switched into the circuit, thereby providing a given level of voltage and current to the load. It may also be desired instead to have a controller input specify a desired vehicle speed. In this mode, vehicle speed is provided as an additional input to the control algorithm, which adds or removes batteries from the circuit with a feedback algorithm to maintain the requested vehicle speed as conditions, e.g. road grade or battery charge state, varied.

It should be noted that in all embodiments of the invention, the relays used can be mechanical, such as contactors, or solid state power transistors, such as an N channel MOSFET or an IGBT.

Although the invention is described herein with reference to the preferred embodiment, one skilled in the art will readily appreciate that other applications may be substituted for those set forth herein without departing from the spirit and scope of the present invention.

For example, a conventional pulse width modulation controller that is configured to provide power up to a given voltage level can be operated in conjunction with the switching circuit, where the switching circuit switches in additional batteries as needed to supply higher voltages to said pulse width modulation controller.

In other embodiments which include automobile racing applications, wheel slippage information from a traction control system is fed to the battery control algorithm so that the maximum number of batteries for which wheel spin does not occur are switched into the circuit.

Further, a battery or plurality of batteries may be switched in and out of the circuit at high frequency to achieve pulse width modulated output voltage levels between those offered by any integral multiples of battery voltages.

Further, the control algorithm can enforce time latency in the increase of controller input to avoid generating large currents when driving in motor loads at zero or low RPMs.

Further, a plurality of solid state switching devices, e.g. MOSFETs or IGBTs, can be used in parallel for switching batteries in and out of the circuit, where the parallelism of devices is necessary due to the high currents involved.

Further, the relays that switch in individual batteries can be of an inadequate current capacity to switch the load at full power, and a single additional high power relay of adequate current capacity to break the circuit under load can be used in a manner analogous to that of a mechanical clutch to break the circuit temporarily to allow the other relays to have their state changed under conditions of no load, thereby extending their life and permitting the use of less expensive lower-current-rated relays.

Further, continuous integration of current delivered by each battery or battery sub-pack can be used to determine the state of charge of each battery for the battery balancing algorithm.

Further, the instantaneous voltage of each battery or battery sub-pack can be used to determine the approximate state of charge of each battery for the battery balancing algorithm.

Accordingly, the invention should only be limited by the Claims included below.

The invention claimed is:

1. A computer implemented apparatus, comprising:
a switching circuit comprising a plurality of relays that are operable to independently switch any of one or more of a plurality of batteries into and out of a motor power circuit; and
a processor configured to balance the use of the plurality of batteries;
wherein the processor is configured to:
receive a throttle position;
determine a particular number that indicates how many batteries to switch into the motor power circuit based at least on the throttle position;
determine a battery state of charge for each battery of the plurality of batteries;
select a number of batteries from the plurality of batteries based on the battery state of charge for said each battery, wherein the number of batteries selected is equal to the particular number of batteries; and
switch the selected number of batteries into the motor power circuit;
wherein the processor is further configured to:
compare the battery state of charge determined for said each battery with the battery state of charge for every other battery of the plurality of batteries;
based on comparing the battery state of charge for said each battery, identify a particular battery that has a greatest battery state of charge among the plurality of batteries; and
add the particular battery into the motor power circuit by closing a relay associated with the particular battery.

2. The apparatus of claim 1, wherein said relays comprise any of electromechanical relays and solid state relays, and wherein said relays further comprise any of normally open relays, normally closed relays, and latching relays.

3. The apparatus of claim 1, where a battery comprises:
an individual battery; or
an array of batteries, wherein the array of batteries is connected in series or in parallel.

4. The apparatus of claim 1, wherein said switching circuit comprises a motor controller for an electric vehicle.

5. The apparatus of claim 4, wherein said processor is configured to determine in real time how many batteries should be switched into said switching circuit to automatically maintain a commanded vehicle speed, as represented by said throttle level signal.

6. The apparatus of claim 1, wherein said processor is configured to determine current delivered by each battery in response to a signal from a sensor, said sensor comprising any of a shunt, a Hall effect sensor, and a voltmeter that estimates battery discharge state from battery voltage.

7. The apparatus of claim 1, wherein each of said plurality of batteries, whether connected in series, parallel, or in series and parallel, is controlled by a single relay.

8. The apparatus of claim 1, further comprising:
a pulse width modulation controller configured to provide power up to a given voltage level;
wherein said switching circuit switches in additional batteries as needed to supply higher voltages to said pulse width modulation controller.

9. The apparatus of claim 1, further comprising:
a traction control system for determining wheel slippage information and for supplying said information to said processor, wherein said processor is configured to receive said information from said traction control system and to operate said switching circuit to switch in a maximum number of batteries for which wheel spin does not occur.

10. The apparatus of claim 1, wherein said processor is configured to operate said switching circuit to switch a battery or plurality of batteries in and out of said motor power circuit at high frequency to provide pulse width modulated output voltage levels between those offered by any integral multiples of battery voltages.

11. The apparatus of claim 1, wherein said processor is configured to enforce a time latency in response to an increase in said throttle level signal to avoid generating large currents when driving in motor loads at zero or low RPMs.

12. The apparatus of claim 1, said switching circuit further comprising:
a plurality of solid state switching devices, comprising any of MOSFETs and IGBTs, that are connected in parallel to switch said batteries in and out of said motor power circuit for high current applications.

13. The apparatus of claim 1, said switching circuit further comprising:
a single additional high power relay of adequate current capacity to break the motor power circuit under load temporarily when the relays that switched are of an inadequate current capacity to switch the load at full power.

14. The apparatus of claim 1, wherein said processor is configured to perform continuous integration of current delivered by each battery to determine a state of charge of each battery.

15. The apparatus of claim 1, wherein said processor is configured to calculate an instantaneous voltage of each battery to determine a state of charge of each battery.

16. The apparatus of claim 1, wherein each of said plurality of batteries may be alternatively switched into said motor power circuit either in series with one or more of said other batteries or in parallel with one or more of said other batteries.

17. A computer implemented method, comprising the steps of:
providing a switching circuit comprising a plurality of relays that are operable to independently switch any of one or more of a plurality of discrete batteries into and out of a motor power circuit; and
providing a processor configured to balance the use of the plurality of batteries by:
receiving a throttle position;
determining a particular number that indicates how many batteries to switch into the motor power circuit based at least on the throttle position;
determining a battery state of charge for each battery of the plurality of batteries;
selecting a number of batteries from the plurality of batteries based on the battery state of charge for said each battery, wherein the number of batteries selected is equal to the particular number of batteries; and
switching the selected number of batteries into the motor power circuit;
wherein the processor is further configured to:
compare the battery state of charge determined for said each battery with the battery state of charge for every other battery of the plurality of batteries;
based on comparing the battery state of charge for said each battery, identify a particular battery that has a greatest battery state of charge among the plurality of batteries; and
add the particular battery into the motor power circuit by closing a relay associated with the particular battery.

18. The apparatus of claim 1, wherein the battery state of charge of said each battery is determined based on an indication of the integrated total energy output since pack recharge.

19. The apparatus of claim 1, wherein determining the particular number of batteries to switch into the motor power circuit is further based on the battery state of charge for said each battery.

* * * * *